United States Patent
Park et al.

(10) Patent No.: US 9,528,207 B2
(45) Date of Patent: Dec. 27, 2016

(54) BICOMPONENT NONWOVEN FABRIC HAVING AN IMPROVED STRENGTH AND AIR PERMEABILITY AND MANUFACTURING METHOD THEREOF

(71) Applicant: TORAY ADVANCED MATERIALS KOREA INC., Kyungsangbuk-do (KR)

(72) Inventors: Jae Gyu Park, Kyungsangbuk-do (KR); Dong Wook Kim, Kyungsangbuk-do (KR); Matsumara Yoshitaka, Kyungsangbuk-do (KR); Je Deuk Yoon, Kyungsangbuk-do (KR)

(73) Assignee: TORAY ADVANCED MATERIALS KOREA INC., Kyungsangbuk-do (KR)

(*) Notice: Subject to any disclaimer, the term of this patent is extended or adjusted under 35 U.S.C. 154(b) by 156 days.

(21) Appl. No.: 14/522,329

(22) Filed: Oct. 23, 2014

(65) Prior Publication Data
US 2016/0002837 A1    Jan. 7, 2016

(30) Foreign Application Priority Data
Jul. 4, 2014   (KR) .................. 10-2014-0083622

(51) Int. Cl.
| | | |
|---|---|---|
| *D04H 1/541* | (2012.01) | |
| *D04H 1/435* | (2012.01) | |
| *B29C 47/00* | (2006.01) | |
| *B29K 67/00* | (2006.01) | |

(52) U.S. Cl.
CPC ............ *D04H 1/541* (2013.01); *B29C 47/004* (2013.01); *D04H 1/435* (2013.01); *B29C 47/0014* (2013.01); *B29K 2067/00* (2013.01); *B29K 2067/003* (2013.01); *B29K 2995/0065* (2013.01); *B29K 2995/0077* (2013.01); *D10B 2331/04* (2013.01); *D10B 2401/063* (2013.01)

(58) Field of Classification Search
CPC ... B29C 47/0014; B29C 47/004; D04H 1/541; D04H 1/435; B29K 2067/00; B29K 2067/003; B29K 2995/0065; B29K 2995/0077; D10B 2331/04; D10B 2401/063; Y10T 442/637; Y10T 442/641
See application file for complete search history.

(56) References Cited

FOREIGN PATENT DOCUMENTS

| | | | |
|---|---|---|---|
| JP | 2001-146671 | A | 5/2001 |
| JP | 2002-180366 | A | 6/2002 |
| JP | 2003-306863 | | 10/2003 |
| KR | 2002-0036636 | A | 5/2002 |
| KR | 2002-0049047 | A | 6/2002 |
| KR | 20030070138 | A | 8/2003 |

OTHER PUBLICATIONS

Translation of JP 2003-306863; published Oct. 31, 2003.*

* cited by examiner

*Primary Examiner* — Catherine A Simone
(74) *Attorney, Agent, or Firm* — Arent Fox LLP

(57) ABSTRACT

A nonwoven fabric having improved air permeability and strength is formed with a filament of sheath-core shape, the core part being constituted with blending a polyethylene terephthalate (PET) having melting point (Tm) of 250~270° C. of 40 to 60 parts by weight with a polytrimethylene terephthalate (PTT) having melting point of 215~235° C. of 10 to 50 parts by weight, the sheath part being constituted with a polyethylene terephthalate (PET) having melting point of 210~230° C. of 10 to 30 parts by weight, and the core and sheath parts being spun with conjugate respectively, and formed with a web. The bicomponent nonwoven fabric uses a bicomponent polymer and improved spin method with conjugate and blending spinning to produce PTT nonwoven fabric having an improved strength and air permeability and soft property and proper resistance which are required for a variety of uses and to produce it economically.

7 Claims, No Drawings

BICOMPONENT NONWOVEN FABRIC HAVING AN IMPROVED STRENGTH AND AIR PERMEABILITY AND MANUFACTURING METHOD THEREOF

CROSS REFERENCE TO RELATED APPLICATIONS

This application claims priority to Korean Patent Application No. 10-2014-0083622, filed on Jul. 4, 2014, the disclosure of which is hereby incorporated by reference in its entirety.

BACKGROUND OF THE INVENTION

Field of the Invention

The present invention relates to a bicomponent nonwoven fabric having an improved strength and air permeability and manufacturing method thereof, and more particularly to a bicomponent nonwoven fabric having an improved strength and air permeability, in which the nonwoven fabric has an improved strength together with an improved air permeability while maintaining a former physical property of the prior nonwoven fabric made of poly trimethyleneterephthalate which has proper durability and softness to be required as a multipurpose sheet and can be produced economically, but has a drawback that its strength and air permeability is unsatisfied, and the method for manufacturing the nonwoven fabric having improved air permeability.

Description of the Prior Art

It is common method to defoliate the weeds by spraying herbicide or to root up it with manual labor as weed-proofing or weeding. However, the method of using herbicide is not preferable since it contaminates the soil or kills a microorganism at the soil which will be beneficial on the growth of plants, so that it can be result in devastation of the soil. Therefore, to solve such conventional problem, the nonwoven fabric has been used to inhibit growth of the weed by inhibiting photosynthesis. Particularly, with covering the soil of agricultural land planted with various crops with nonwoven fabric, while suppressing the growth of weeds, the air is permeated and the soil is warmed so that the growth of crops can be facilitated. Therefore, the sheet which is configured to fit the above object is widely used in agriculture. As such nonwoven fabric for agriculture, a polyolefin-based, especially a polypropylene-based spunbond nonwoven fabric considering the sides of economy as a raw material has been proposed and has been used. More specifically, the said agricultural nonwoven fabric, for example, nonwoven fabric which is constructed by using a synthetic fiber filament yarn made of a polypropylene resin is provided which one side of the nonwoven fabric is partially thermocompression bonding embossing process or a nonwoven fabric is produced with free embossing.

For example, Korean patent early publication 2002-36636 describes, with the title of "nonwoven fabric for agriculture", nonwoven fabric which synthetic fiber filament yarn of 2-3 denier is arranged with the density of 55~65 g/m² smoothly, and then heat-pressed with a roller press to be embossed on one or both sides. These nonwoven fabrics for agriculture have a relatively good mechanical properties and its handling is easy. Also, these nonwoven fabrics have effects that the contact area with air becomes large by concave-convex parts of embossing so that the permeation of air is seamlessly. However, these nonwoven fabric thicken not to achieve an optimal air flow, and to increase the shielding degree of light, so that the corps take the rootlet into these nonwoven fabric due to misconception as soil and then the corps is withered when dry whether. Therefore, it is necessary a solution for this problem and various methods have been proposed to solve it. Such as the pre-mentioned description, the approach for improving the nonwoven fabric for agriculture relates, for example physical properties of nonwoven fabric, since the conventionally proposed nonwoven fabric for agriculture has drawback that its thick is excess and an air flow is not smooth, and a content of moisture is also excess so that there is a problem that it is difficult to achieve the original object as an inhibition of growth of weed.

But, the conventional nonwoven fabric for agriculture has a drawback that its strength and resistance is insufficient to use as an agricultural usage, although the conventional nonwoven fabric for agriculture has economical advantage since the polypropylene made of it can be produced at low cost.

On the other hand, as those having good resistance, polytrimethylene terephthalate (PTT) had been provided with the nonwoven fabric and synthetic fibers of various kinds. For example, Korean Patent Application No. 2002-0049047 describes a preparing method of polytrimethylene terephthalate staple fiber which comprises a step of (a) supplying polytrimethylene terephthalate, (b) spinning melted polytrimethylene terephthalate at a temperature of 245-285° C. to a filament, (c) quick quenching the filament, (d) extending the quenched filament, (e) winding the extended filament with 8 to 30 winding orders/inches (3 to 12 winding orders/cm) by using a mechanical winder, (f) relaxing the winded filament at a temperature of 50-120° C., and (g) cutting the relaxed filament with a staple fiber of a length of 0.2 to 6 inches (about 0.5 to 15 cm). Also, Korean Patent Application No. 2003-0070138 describes a polyester-based latent-crimping conjugated fiber and method for preparing the same. Japanese patent publication No. 2001-146671 describes a long fiber nonwoven fabric, Japanese patent publication No. 2003-306863 describes a polyester filament nonwoven fabric and a separation membrane using the same, and Japanese patent publication No. 2002-180366 describes a filament nonwoven fabric having excellent formability.

But, the prior art such as the said one never describes and suggests for a nonwoven fabric and producing method thereof which has a physical property suitable for the nonwoven fabric for agriculture while it has air permeability above a desired level as an economical nonwoven fabric by using PTT. Therefore, it is acutely needed to provide for a nonwoven fabric having air permeability above a desired level, while it keeps a physical property of PPT nonwoven fabric according to the prior art, so that the present inventors invented the a nonwoven fabric having an improved air permeability and filed it with the patent application.

However, the present inventors recognized that the PTT nonwoven fabric according to said patent application still has a drawback of a weak strength even though its softness and air permeability are excellent, and tried the various method for the spun condition and procedure to improve the said drawback, and, as a result, achieved the present invention.

SUMMARY OF THE INVENTION

Accordingly, the present invention has been made in view of the problems occurring in the prior art, and it is the main purpose of the present invention to provide a nonwoven fabric having an improved air permeability and strength as well as soft property and proper resistance of the prior PPT nonwoven fabric and being capable of produced economically.

Another object of the present invention is to provide a production method which can solve the above-described problems occurring in the prior art, and thus can more easily produce nonwoven fabric having the said excellent property.

Still another object of the present invention is to achieve other objects which can be easily conceived by a person skilled in the art from the above-described clear objects and the description of the specification of the present invention.

As the result of investigation for method improvable air permeability and strength with keeping soft property and resistance of the prior PPT nonwoven fabric excellently, the said object of the present invention can be achieved by producing PPT nonwoven fabric by spinning with sheath-core shape using a bicomponent polymer and then by optimizing a procedure condition.

To achieve the above objects, in one aspect, the present invention provides nonwoven fabric having improved air permeability and strength which is formed with a filament of sheath-core shape, wherein the core part is constituted with blending a polyethylene terephthalate (PET) having melting point (Tm) of 250~270° C. of 40 to 60 parts by weight with a polytrimethylene terephthalate (PTT) having melting point of 215~235° C. of 10 to 50 parts by weight, and the sheath part is constituted with a polyethylene terephthalate (PET) having melting point of 210~230° C. of 10 to 30 parts by weight, and the said core and sheath parts are spun with conjugate respectively, and then formed with a web.

In a preferred embodiment of the present invention, the said nonwoven fabric is formed by heat pressing the said web with free-embossing or embossing pattern of single or multi layer.

In a preferred embodiment of the present invention, a basic weight of the said nonwoven fabric is 40 to 100 g/m².

In a preferred embodiment of the present invention, the air permeability of the said nonwoven fabric is above 200 ccs.

In a preferred embodiment of the present invention, the strength of the said nonwoven fabric is MD strength of above 20 kgf/5 cm and CD strength of above 10 kgf/5 cm.

In another aspect, the present invention provides a method for producing nonwoven fabric having improved air permeability and strength, the method being related to production of nonwoven fabric of sheath-core shape and comprising the steps of:

drying a polyethylene terephthalate (PET) having melting point (Tm) of 250~270° C. of 40 to 60 parts by weight and a polytrimethylene terephthalate (PTT) having melting point of 215~235° C. of 10 to 50 parts by weight as the core part and crystallizing and then providing it with an extruder;

drying a polyethylene terephthalate (PET) having melting point of 210~230° C. of 10 to 30 parts by weight in the drier as the sheath part and crystallizing and then providing it with an extruder;

spinning to sheath-core shape with one spinneret through each feed pump;

cooling and consolidating it to prevent welding among the filament;

elongating and forming a web; and bonding the said filament web.

In a preferred embodiment of the present invention, the said spinneret is mixed with a general spinneret and a large denier spinneret having 52 holes.

Being constituting as the above, the bicomponent nonwoven fabric having improved strength and air permeability and the method for producing thereof according to the present invention uses a bicomponent polymer and improves spun method with conjugate and blending spinning to produce PTT nonwoven fabric and optimizes a procedure condition, so that the said problem at prior art can be solved to provide a nonwoven fabric having an improved strength and air permeability as well as soft property and proper resistance which is required for the nonwoven fabric sheet of various usage and to make it possible to produce it economically.

DETAILED DESCRIPTION OF THE INVENTION

Hereinafter, the present invention will be described in further detail with reference to preferred embodiments. It is to be understood, however, that the scope of the present invention is not limited to these embodiments.

The bicomponent nonwoven fabric having improved strength and air permeability according to the present invention may be constructed with single layer or multi layer structure of spunbonded nonwoven fabric sheet and/or melt-blown nonwoven fabric sheet and is constructed by heat-pressing nonfabric tissue under certain pressure and certain temperature.

The said bicomponent nonwoven fabric having improved strength and air permeability of the present invention is preferably formed with a filament web of sheath-core shape, wherein the core part is constituted with blending a polyethylene terephthalate having melting point of 250~270° C. of 40 to 60 parts by weight with a polytrimethylene terephthalate having melting point of 215~235° C. of 10 to 50 parts by weight, and the sheath part is constituted with a polyethylene terephthalate having melting point of 210~230° C. of 10 to 30 parts by weight, and the said core and sheath parts are spun with conjugate respectively, and formed with a web, and then the said web is heat pressed along with free-embossing or embossing pattern to form a long fiber nonwoven fabric of single or multi layer.

In case of being weight rate of the said polytrimethylene terephthalate below 10% by weight, a soft property of the nonwoven fabric is not sufficient so that workability becomes wrong at using the product. In contrary, in case of being weight rate of the said polytrimethylene terephthalate exceed 50% by weight, it is not preferable since the strength is declined and the cost for production is increased.

In a preferred embodiment of the present invention, a basic weight of the said nonwoven fabric is preferably 40 to 100 g/m².

In a preferred embodiment of the present invention, the denier of filament consisting of the said nonwoven fabric is preferably at least 2 to maximum 12 deniers, and the air permeability of the said nonwoven fabric is preferably above 200 ccs, and the strength of the said nonwoven fabric is MD strength of above 20 kgf/5 cm and CD strength of above 10 kgf/5 cm.

According to a different preferred embodiment of the present invention, the fabric constituting the said nonwoven fabric may preferably comprise the UV stabilizer of 6.0-9.0 parts by weight which contains Hindered amine light stabilizer (HLAS) of 0.1-1.5 parts by weight based on the fabric 100 parts by weight, to increase a weatherproof. In case of being the added amount of UV stabilizer below 0.1 parts by weight with respect to total PTT or PTT and PET resin, an effect of weatherproof is insufficient, and in case of being the added amount of UV stabilizer exceed 1.5 parts by weight, it is not preferable since the workability is poor such that pressure increases and yarn cutting occurs, and the cost for production is increased.

According to a preferred embodiment of the present invention, a method for producing nonwoven fabric having improved air permeability and strength according to the present invention comprises the steps of drying a polyethylene terephthalate having melting point of 250~270° C. of 40 to 60 parts by weight and a polytrimethylene terephthalate having melting point of 215~235° C. of 10 to 50 parts by weight as the core part and crystallizing and then providing it with an extruder; drying a polyethylene terephthalate having melting point of 210~230° C. of 10 to 30 parts by weight in the drier as the sheath part and crystallizing and then providing it with an extruder; forming a filament; cooling the said filament with cooled air, and consolidating it to prevent inter-welding between the filament; elongating and dispersing the filament by crashing it to an impinging plate with certain velocity and angle to form a web; stacking the prepared filament uniformly on the moving conveyer belt successively to form a web by using a suction device at below; and thermally bonding the said stacked filament web by using the calendar which has the upper roll set at temperature of 210° C. and the lower roll set at temperature of 208° C., and nip pressure of 50-70 kg/cm, and whose bonding rate is 15-30%.

Hereinafter, the present invention will be described in detail with reference to the following examples, but the scope of the present invention is not limited to those examples.

Example 1

The filament of nonwoven fabric was prepared as followings. A polyethylene terephthalate having melting point of 260° C. and a polytrimethylene terephthalate polymer having melting point of 225° C. as the core part were dried in each dryer to moisture contents of below 100 ppm respectively, and crystallized and then provided with one extruder which temperature of each zone was set at 280° C., and a polyethylene terephthalate having melting point of 224° C. as the sheath part was dried in a dryer to moisture contents of below 100 ppm, and crystallized and then provided with one extruder which temperature of each zone was set at 260° C. And it were supplied to one spinneret through each supplying pump, wherein the said spinneret was consisted of a spinneret whose diameter is 0.28 to 0.60 mm and which can spin with 2 to 4 denier of average filament fineness and a large denier spinneret can spin with 7 to 13 denier of average filament fineness, and was arranged in parallel with each other. Wherein a filament was formed such that the spun polyethylene terephthalate having melting point of 260° C. was to 60 parts by weight with respect to total weight, a polytrimethylene terephthalate polymer having melting point of 225° C. was to 20 parts by weight with respect to total weight, and a polyethylene terephthalate having melting point of 224° C. was to 20 parts by weight with respect to total weight, and three kinds of high molecule were spun with 285 g per minute to form a filament. The filament was cooled with cold air from a quenching chamber, and consolidated it to prevent welding among the filament. And then the cooled filament was elongated through an air ejector to give a property as a filament. To form a web, the said filament was dispersed by crashing it to an impinging plate with certain velocity and angle and stacked the said filament uniformly on the moving conveyer belt successively by using a suction device disposed at below of conveyer belt. To thermally bond the said web, the calendar was used which had the upper roll set at temperature of 210° C. and the lower roll set at temperature of 208° C. The nonwoven fabric manufactured in this manner was measured for its properties as following experimental example, and the measurement results were shown in Table 1.

Example 2

The nonwoven fabrics were manufactured using the same procedure as Example 1 above in the same condition as Example 1 except that a polyethylene terephthalate having melting point of 260° C. was to 40 parts by weight with respect to total weight, a polytrimethylene terephthalate polymer having melting point of 225° C. was to 50 parts by weight with respect to total weight, and a polyethylene terephthalate having melting point of 224° C. was to 10 parts by weight with respect to total weight. The nonwoven fabric manufactured in this manner was measured for its properties, and the measurement results were shown in Table 1.

Comparative Example 1

The nonwoven fabrics were manufactured using the same procedure as Example 1 above in the same condition as Example 1 except that a polyethylene terephthalate having melting point of 260° C. was to 20 parts by weight with respect to total weight, a polytrimethylene terephthalate polymer having melting point of 225° C. was to 60 parts by weight with respect to total weight, and a polyethylene terephthalate having melting point of 224° C. was to 20 parts by weight with respect to total weight. The nonwoven fabric manufactured in this manner was measured for its properties, and the measurement results were shown in Table 1.

Comparative Example 2

The nonwoven fabrics were manufactured using the same procedure as Example 1 above in the same condition as Example 1 except that a polyethylene terephthalate having melting point of 260° C. was to 60 parts by weight with respect to total weight, a polytrimethylene terephthalate polymer having melting point of 225° C. was to 40 parts by weight with respect to total weight, and two kinds of high molecule were spun at core part and sheath part. The nonwoven fabric manufactured in this manner was measured for its properties, and the measurement results were shown in Table 1.

Comparative Example 3

The nonwoven fabrics were manufactured using the same procedure as Example 1 above in the same condition as Example 1 except that a polyethylene terephthalate having melting point of 260° C. was to 60 parts by weight with respect to total weight, a polytrimethylene terephthalate polymer having melting point of 225° C. was to 40 parts by weight with respect to total weight, and two kinds of high molecule were spun with mixing. The nonwoven fabric manufactured in this manner was measured for its properties, and the measurement results were shown in Table 1.

Experimental Example

The nonwoven fabrics manufactured in the manner of Examples and Comparative examples were measured for its properties as followings:

(1) weight per unit area (weight: g/m²): it was measured according to the method of ASTM D 3776-1985.

(2) tensile strength: the maximum load was obtained according to the method of ASTM D 1682-64 using the tensile strength and extensometer device (Instron), under condition of sample piece width of 5 cm, its interval of 7.5 cm and tensile velocity of 300 mm/min.

(3) tensile extension: the extension degree was obtained when being maximum extension according to the above method (2).

(4) air permeability: the amount of air which flows after passing through a certain area of the nonwoven fabrics vertically was measured by using an orifice (circular sample piece grasping device) which can test an area of 38 cm² by the method of KS K 0570.

(5) thickness: it was measured by using the dial gauge.

TABLE 1

| Item | Unit | Exp. 1 | Exp. 2 | Comparative Exp. 1 | Comparative Exp. 2 | Comparative Exp. 3 |
|---|---|---|---|---|---|---|
| Total weight | gsm | 70 | 70 | 70 | 70 | 70 |
| Tm 260° C. PET contents | % | 60 | 40 | 20 | 60 | 60 |
| Tm 224° C. PET contents | % | 20 | 50 | 60 | 40 | 40 |
| Tm 225° C. PTT contents | % | 20 | 10 | 20 | — | — |
| Spun type | | Conjugate + Blend | Conjugate + Blend | Conjugate + Blend | Conjugate | Blend |
| Arrangement shape of each hole packs | | parallel | parallel | parallel | parallel | parallel |
| Temperature of upper calendar | ° C. | 210 | 210 | 210 | 210 | 210 |
| Temperature of lower calendar | ° C. | 208 | 208 | 208 | 208 | 208 |
| Strength (MD) | kgf/5 cm | 29.8 | 25.3 | — | 15.6 | 18.5 |
| Strength (CD) | kgf/5 cm | 15.1 | 12.8 | — | 13.2 | 9.6 |
| Extension (MD) | % | 45.3 | 64.2 | — | 87.2 | 74.6 |
| Extension (CD) | % | 41.7 | 63.8 | — | 82.6 | 75.2 |
| Thickness | μm | 0.34 | 0.33 | — | 0.35 | 0.31 |
| Air permeability | ccs | 271 | 253 | — | 247 | 223 |
| web formability | | good | good | Web forming impossible | good | good |

Although the preferred embodiments of the present invention have been described for illustrative purposes, those skilled in the art will appreciate that various modifications, additions and substitutions are possible, without departing from the scope and spirit of the invention as disclosed in the accompanied claims.

What is claimed is:

1. The bicomponent nonwoven fabric having improved strength and air permeability which is formed with a filament of sheath-core shape, wherein the core part is constituted with blending a polyethylene terephthalate (PET) having melting point (Tm) of 250~270° C. of 40 to 60 parts by weight with a polytrimethylene terephthalate (PTT) having melting point of 215~235° C. of 10 to 50 parts by weight, and the sheath part is constituted with a polyethylene terephthalate (PET) having melting point of 210~230° C. of 10 to 30 parts by weight, and the said core and sheath parts are spun with conjugate respectively, and then formed with a web.

2. The nonwoven fabric of claim 1, wherein the said nonwoven fabric is formed by heat pressing the said web with free-embossing or embossing pattern of single or multi layer.

3. The nonwoven fabric of claim 1, wherein a basic weight of the said nonwoven fabric is 40 to 100 g/m².

4. The nonwoven fabric of claim 1, wherein the air permeability of the said nonwoven fabric is above 200 ccs.

5. The nonwoven fabric of claim 1, wherein the strength of the said nonwoven fabric is MD strength of above 20 kgf/5 cm and CD strength of above 10 kgf/5 cm.

6. The method for producing a bicomponent nonwoven fabric having improved strength and air permeability, the method being related to production of nonwoven fabric formed with a filament of sheath-core shape and comprising the steps of:

drying a polyethylene terephthalate (PET) having melting point (Tm) of 250~270° C. of 40 to 60 parts by weight and a polytrimethylene terephthalate (PTT) having melting point of 215~235° C. of 10 to 50 parts by weight as the core part and crystallizing and then providing it with an extruder;

drying a polyethylene terephthalate (PET) having melting point of 210~230° C. of 10 to 30 parts by weight in the drier as the sheath part and crystallizing and then providing it with an extruder;

spinning to sheath-core shape with one spinneret through each feed pump;

cooling and consolidating it to prevent welding among the filament;

elongating and forming a web; and bonding the said filament web.

7. The method for producing a nonwoven fabric of claim 6, wherein the said spinneret is mixed with a spinneret which can spin with 2 to 4 denier of average filament fineness and a large denier spinneret can spin with 7 to 13 denier of average filament fineness.

* * * * *